2,769,838

POLYGLYCOL ETHER ACID ANILIDES

Max Matter, Worb, near Bern, Alberto Rossi, Bern, and Hans von Sprecher, Basel, Switzerland, assignors to Ciba Pharmaceutical Products, Inc., Summit, N. J.

No Drawing. Application November 16, 1954, Serial No. 469,296

Claims priority, application Switzerland November 20, 1953

4 Claims. (Cl. 260—562)

This invention relates to poly-1:2-glycol ethers of aliphatic α-hydroxy-carboxylic acid arylides and particularly to poly-1:2-glycol ethers of the formula

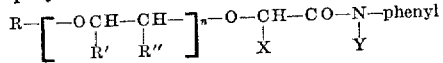

in which $n$ represents a whole number greater than one, R represents hydrogen or a hydrocarbon radical containing at most 7 carbon atoms, e. g., methyl, ethyl, propyl, butyl, amyl, hexyl and heptyl radicals, and R' and R" each represent a hydrogen atom or a lower alkyl or lower alkoxy-alkyl group, especially a methyl, methoxy methyl or ethoxy methyl group, provided that R' and R" represent hydrogen in at least $n/2$ of the residues

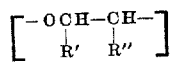

X represents hydrogen or a lower hydrocarbon radical, such as a lower alkyl radical, e. g. methyl, ethyl, propyl, butyl or amyl radicals, "Phenyl" represents a phenyl residue, which advantageously contains substituents, for example, one or more alkyl groups, e. g. ethyl, propyl, butyl and especially methyl radicals, free or substituted hydroxyl such as alkoxy groups, e. g. methoxy, ethoxy, propoxy, butoxy or amyloxy radicals, or halogen atoms, and Y represents hydrogen or an aromatic residue, advantageously a phenyl residue, or an aliphatic or cyclo-aliphatic hydrocarbon radical, such as an alkyl or cyclo-alkyl group containing not more than 7 carbon atoms.

Especially valuable are compounds of the formula

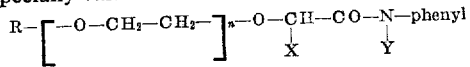

in which $n$ represents a whole number from 2 to 20 and preferably from 4 to 8 inclusive, R and X represent hydrogen or a lower alkyl group, especially methyl, ethyl, propyl or butyl, and Y represents hydrogen, a radical having the same meaning defined for phenyl or an alkyl or cycloalkyl residue containing not more than 7 carbon atoms, such as methyl, ethyl, butyl cyclopentyl or cyclohexyl. Especially valuable are compounds of the last mentioned formula in which phenyl represents a 2:6-dimethyl-phenyl radical, Y represents hydrogen or a lower alkyl radical such as a butyl residue, and X represents hydrogen, and R stands for methyl.

The new poly-1:2-glycol ethers possess valuable pharmacological properties. Thus, they exhibit a pronounced anaesthetic action and are useful as medicaments more particularly as cough depressants. It is noteworthy that these ether-amides generally exhibit a considerable solubility in water. Their aqueous solutions possess the characteristic of becoming turbid when heated at a certain temperature which is dependent on the concentration. This temperature in the case of a solution of 10 percent strength is called the turbidity point, and is a physical constant characteristic of the particular compound. The turbidity is reversible. Thus upon cooling the solution becomes clear again.

In general the poly-1:2-glycol ethers of aliphatic α-hydroxy-carboxylic acid arylides can be prepared by reacting a reactive ester, especially an ester of a strong inorganic or organic acid, such as a hydrohalic acid or an organic sulfonic acid, for example, benzene sulfonic acid, of an aliphatic α-hydroxy-carboxylic acid arylide with a poly-1:2-glycol, preferably in the form of a metal alcoholate thereof, such as an alkali metal alcoholate thereof, or in the presence of a condensing agent. The reaction may be carried out in stages, for example, by first forming in the manner described above a glycol-(1:2)-ether of an aliphatic α-hydroxycarboxylic acid arylide, which may still contain free glycol hydroxyl groups, or forming a reactive ester thereof, and converting the product into a poly-1:2-glycol ether in the manner described above.

Alternatively a poly-1:2-glycol ether of an aliphatic α-hydroxycarboxylic acid halide, especially the chloride is reacted with the appropriate arylamine, advantageously in the presence of an acid-binding agent, such as an inorganic or organic base, for example, a tertiary amine such as pyridine.

Finally an aliphatic α-hydroxy-carboxylic acid arylide may be converted directly or in stages into a poly-1:2-glycol ether thereof by treatment with an alkylene-1:2-oxide.

The reactions are carried out in the presence or absence of a diluent such as an aromatic hydrocarbon, e. g. benzene or toluene.

The invention also includes the production of mixtures of final products, especially those in which the number $n$ has different meanings, that is to say, an average value. These mixtures can be made in accordance with the invention, for example, by employing the appropriate poly-1:2-glycol mixtures or hydroxy-derivatives or ethers thereof with the α-hydroxy-carboxylic acid halides as starting materials, or they can be formed in the reaction with alkylene-1:2-oxides referred to above.

The new compounds can be used as medicaments in the form of pharmaceutical preparations which contain them in admixture with a pharmaceutical adjuvant as a carrier facilitating the administration thereof, e. g., a pharmaceutical organic or inorganic carrier material suitable for enteral, parenteral or oral application. For the production of these preparations inert pharmaceutical adjuvants are employed as carriers, namely, such substances as do not react with the new compounds, as for example water, gelatine, lactose, starches, magnesium stearate, talc, vegetable oils, benzyl alcohols, gums, polyalkylene glycols, petroleum jelly, cholesterol, or other known medicament carriers. The pharmaceutical preparations can be made up, for example, as tablets, dragees, or in liquid form as solutions, suspensions or emulsions, e. g. in the form of elixirs. They are sterilized if desired, and/or may contain auxiliary substances such as preservative, stabilizing, wetting or emulsifying agents, salts which vary the osmotic pressure or buffer substances. They may also contain other therapeutically valuable substances.

The following examples illustrate the invention, the parts being by weight unless otherwise stated and the relationship of parts by weight to parts by volume being the same as that of the gram to the cubic centimeter:

Example 1

The acid chloride (obtained from a solution of 31 parts of the ether of penta-ethylene glycol mono-methyl ether with glycollic acid of the formula

in 90 parts by volume of benzene by heating the solution for one hour at 50° C. with 90 parts by volume of thionyl chloride, distilling off the greater part of the thionyl chloride and benzene under reduced pressure, removing the last residues of thionyl chloride by taking up the residue twice in 90 parts by volume of toluene and concentrating in vacuo) is dissolved in 90 parts by volume of toluene, and mixed at 0° C. while stirring, first, dropwise with a solution of 17.7 parts of N-butyl-(n)-2:6-dimethyl-aniline in 40 parts by volume of toluene and then with a solution of 7.9 parts of pyridine in 40 parts by volume of toluene. After allowing the mixture to stand for 2 hours at room temperature the greater part of the solvent is evaporated in vacuo and the residue is taken up in 450 parts by volume of chloroform. The chloroform solution is extracted by agitation three times with 150 parts by volume of 2 N-sulfuric acid, twice with 150 parts by volume of a 1 N-solution of caustic soda and with 150 parts by volume of water. The aqueous layers are then extracted in succession with 200 parts by volume of chloroform. The combined chloroform layers are finally concentrated by evaporation, and there are obtained therefrom by degassing in a high vacuum as a residue 46.9 parts of ether of penta-ethylene glycol mono-methyl ether with glycollic acid N-butyl-(n)-N-2:6-dimethyl-phenylamide of the formula

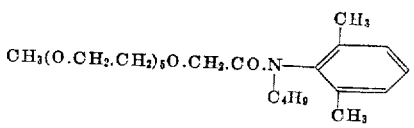

This product is a practically colorless oil which dissolves well in ethanol, benzene, ethyl acetate and cold water. Upon heating an aqueous solution of the product of 10 percent strength the new amide precipitates in the form of an oil at temperatures above 50° C., and the oil redissolves to form a clear solution upon cooling. Accordingly, the turbidity point is 50° C. (aqueous solution of 10 percent strength).

The glycollic acid ether used as starting material in this example may be prepared as follows:

530 parts by weight of the benzene sulfonic acid ester of diethylene glycol mono-methyl ether is run in the course of 4 hours at 100° C., while stirring into a solution of 50 parts of sodium in 800 parts by volume of triethylene glycol, and the reaction mixture is maintained overnight at 100° C. After cooling the mixture, it is mixed with 500 parts by volume of water and 100 parts by volume of chlorofrom, and the whole is thoroughly agitated. The chloroform layer is extracted twice with 250 parts by volume of water on each occasion, and then evaporated. 220 parts of crude penta-ethylene glycol mono-methyl ether remain behind. By extracting the three aqueous layers five times with 500 parts by volume of chloroform on each occasion, there are obtained a further 250 parts of crude penta-ethylene glycol mono-methyl ether. From the crude product there is obtained by distillation in a high vacuum of 0.01 mm. and at 110° C. 100 parts of a pure ether in the form of a colorless oil.

10 parts of potassium are then dissolved, while stirring, in 140 parts by weight of penta-ethylene glycol monomethyl ether having a temperature of 80–90° C. in an atmosphere of hydrogen. The solution is then cooled to 40° C., and 12.1 parts of chloracetic acid are added, while stirring strongly, whereupon a thick milky emulsion is formed and the temperature rises to 55° C. The mixture is stirred for a further 15 minutes at that temperature, and then heated at 95° C. for 1½ hours. The mixture, which has become thinly fluid, is cooled and mixed with 150 parts by volume of a 1 N-solution of caustic soda. In order to remove the excess of penta-ethylene glycol monomethyl ether, the alkaline solution is extracted once with 1000 parts by volume of chloroform and 5 times with 200 parts by volume of chloroform. The chloroform layers are first washed in succession twice with 50 parts by volume of a 0.5 N-solution of caustic soda, then combined and evaporated. The residue consists of 105 parts of regenerated penta-ethylene glycol monomethyl ether. The combined aqueous alkaline layers are acidified with 35 parts by volume of hydrochloric acid, and then extracted once with 600 parts by volume of chloroform and 5 times with 300 parts by volume of chloroform. From the chloroform solution there is obtained by concentration and degassing in a high vacuum at 70–80° C. 31.6 parts of the ether of penta-ethylene glycol monomethyl ether with glycollic acid in the form of a pale brown oil. The crude ether-acid can be purified by way of its methyl ester. The latter is prepared by converting the acid into its acid chloroide by means of thionyl chlororide, and reacting the acid chloride with methanol. It distils as a colorless oil at 145–147° C. under 0.01 mm. pressure of mercury, and can easily be reconverted into the ether-acid by alkaline hydrolysis. In the pure state it is a practically colorless oil soluble in water, ethanol and benzene.

The N-butyl-n-2:6-dimethyl-aniline used in this example is prepared as follows:

24.2 parts of 2:6-dimethyl-aniline are heated with 27.4 parts of n-butyl bromide in a closed vessel for 14 hours at 100° C. The cooled crystalline mass is recrystallised from 150 parts by volume of water. The crystals, which melt at 214–216° C., are then mixed with a solution of sodium carbonate, and the mixture is extracted twice with ether. After evaporating the ether, the residue is fractionated in a column, and 30 parts of N-butyl-(n)-2:6-dimethyl-aniline distil in the form of a colorless oil at 116–118° C. under 10 mm. pressure of mercury.

*Example 2*

The acid chloride (obtained from 44.2 parts of the ether of octaethylene glycol monomethyl ether with glycollic acid of the formula.

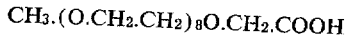

by reaction with 100 parts by volume of thionyl chloride in 100 parts by volume of benzene at 50° C., in a manner analogous to that described in Example 1) is dissolved in 100 parts by volume of toluene and mixed at 0° C., while stirring, first dropwise with a solution of 17.7 parts of N-butyl-(n)-2:6-dimethylaniline in 40 parts by volume of toluene and then with a solution of 7.9 parts of pyridine in 40 parts by volume of toluene. The whole is allowed to stand for 3 hours at room temperature and worked up as described in Example 1. There are obtained 59 parts of the ether of octa-ethylene glycol monomethyl ether with glycollic acid-N-butyl-(n)-N-2:6-dimethylphenyl-amide of the formula

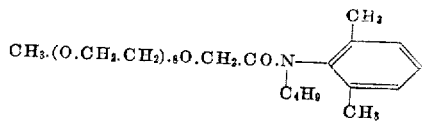

This product is a pale yellow oil which dissolves well in ethanol, benzene, ethyl acetate and cold water. By mixing an aqueous solution of the product of 10 percent strength with a small amount of animal carbon, a colorless oil is obtained after filtering and evaporating the filtrate.

The product has a turbidity point of 65° C. (aqueous solution of 10 percent strength).

The ether-carboxylic acid used as starting material in this example may be prepared as follows:

13 parts of potassium are dissolved while stirring, in an atmosphere of hydrogen at 110–115° C. in 260 parts of octa-ethylene glycol monomethyl ether boiling at 165° C. under 0.005 mm. pressure, which can be obtained in a manner analogous to the corresponding pentaethylene glycol monomethyl ether in Example 1 by reacting the benzene sulfonic acid ester of diethylene glycol monomethyl ether with tetraethylene glycol to form the hexaethylene glycol monomethyl ether, converting the latter into its benzene sulfonic acid ester and reacting the product with diethylene glycol. The mixture is then cooled to 30° C., and mixed, while stirring with 15.8 parts of chlorosulfonic acid, whereupon the temperature rises to 62° C. After having stirred the mixture for a further 1½ hours at 90° C., the product is worked up in a manner analogous to that described in Example 1, and there are obtained, in addition to 192 parts of the regenerated octaethylene glycol monomethyl ether, 59 parts of the ether of octaethylene glycol monomethyl ether with glycollic acid in the form of a pale brown powder. This crude ether-acid can also be purified by way of its methyl ester as in the case of the acid described in Example 1. It distils as a colorless oil at 205–207° C. under 0.01 mm. pressure. The acid can easily be regenerated from the methyl ester by alkaline hydrolysis and in the pure state the acid is a practically colorless oil soluble in water, ethanol and benzene.

*Example 3*

The acid chloride (obtained from 0.5 part of the ether of the poly-ethylene glycol monomethyl ether with glycollic acid of the formula $$CH_3.(O.CH_2.CH_2)_n O.CH_2.COOH$$

in which $n$ has the average value of about 6–8, by heating it in 15 parts by volume of benzene for ½ hour with 15 parts by volume of thionyl chloride at 50–60° C., and purified as described in Example 1) is dissolved in 5 parts by volume of benzene and mixed at 0° C. with a solution of 4.5 parts of N-butyl-($n$)-2:6-dimethylaniline and 1 part of pyridine in 5 parts by volume of benzene. The mixture is allowed to stand at room temperature for 2 hours, and then worked up in a manner analogous to that described in Example 1. There are obtained 6.2 parts of the ether of polyethylene glycol monomethyl ether with glycollic acid N-butyl-($n$)-N-2:6-dimethyl-phenyl-amide of the formula

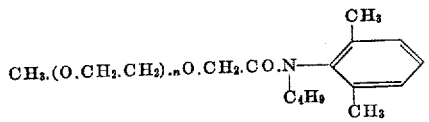

in which $n$ has the average value of about 6–8, in the form of a yellow oil which dissolves well in ethanol, benzene, ethyl acetate and cold water.

For the purpose of purification an aqueous solution of the crude oil of 10 percent strength is treated in the warm with a small amount of animal carbon and filtered. After extraction 3 times with chloroform, the product is obtained by evaporation of the chloroform extract as a practically colorless oil.

The new ether-amide is a mixture and as such has a turbidity point of 62–63° C. (aqueous solution of 10 percent strength). The ether of the polyethylene glycol monomethyl ether with glycollic acid ($n$=about 6–8) used as starting material in this example is prepared as follows:

5 parts of potassium are dissolved at 100° C. in 140 parts of polyethylene glycol monomethyl ether boiling at 135–175° C. under 0.005 mm. pressure in an atmosphere of hydrogen. The said ether is obtained by fractional distillations from the commercial poly-ethylene glycol monomethyl ether having the average molecular weight of 350, and, owing to its boiling range, has an average polymerization number ($n$) of approximately 6–8. The viscous solution is cooled to 35° C., 6 parts of chloracetic acid are added, whereby the temperature rises to 50° C. After stirring the mixture for one hour at 50–60° C. and 2 hours at 100° C., the product is worked up in a manner analogous to that described in Example 1 for the corresponding ether acid, and there are obtained 24 parts of the said glycollic acid-ether in the form of a bright yellow oil, and also 110 parts of the regenerated polyethylene-glycol monomethyl ether ($n$=about 6–8), which again boils between 135 and 175° C. under 0.005 mm. pressure of mercury.

The methyl ester of this glycollic acid-ether which can be obtained either by way of its acid chloride in a manner analogous to that described in Example 1 or by reaction of the carboxylic acid with an ethereal solution of diazo methane distils as a colorless oil between 150 and 190° at 0.005 mm. pressure of mercury.

The free acid can be regenerated therefrom by alkaline hydrolysis in the form of a practically colorless oil, which dissolves well in water, ethanol, benzene and ethyl acetate.

*Example 4*

The acid chloride (obtained from 4.1 parts of the ether of the polyethylene glycol monomethyl ether with glycollic acid of the formula $$CH_3.(O.CH_2.CH_2)_n O.CH_2COOH$$

in which $n$ has the average value of about 6–8, by heating it in 15 parts by volume of benzene for one hour with 15 parts by volume of thionyl chloride at 50–60° C., and purified as described in Example 1) is dissolved in 5 parts by volume of benzene and mixed at 0° C. with a solution of 3 parts of 2:6-dimethylaniline (boiling at 92–93° C. under 12 mm. pressure) and 0.9 part of pyridine in 10 parts by volume of benzene. After allowing the mixture to stand for one hour, it is taken up in 100 parts by volume of chloroform, agitated with 2 N-hydrochloric acid, a 1 N-solution of caustic soda and water, and the aqueous layers are extracted with 50 parts by volume of fresh chloroform.

The purified chloroform layers yield upon evaporation 5.2 parts of the ether of the polyethylene glycol monomethyl ether with glycollic acid-N-2:6-dimethylphenyl-amide of the formula

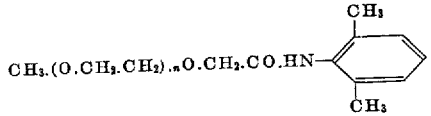

in which $n$ has the average value of about 6–8, in the form of a bright yellow oil.

This product dissolves well in water, alcohol, benzene and ethyl acetate, and can be decolorized by treating an aqueous solution of 10 percent strength of the product with animal carbon.

Its turbidity point is >100° C. (10 percent aqueous solution).

The ether of the polyethylene glycol monomethyl ether with glycollic acid used as starting material in this example is prepared as described in Example 3.

By reacting in an analogous manner the ether from diethylene glycol monomethyl ether and glycollic acid chloride with 2:6-dimethylaniline there is likewise obtained in good yield the ether of diethylene glycol monomethyl ether with glycollic acid-N-2:6-dimethylphenyl amide of the formula

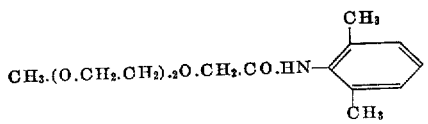

It has a turbidity point of 50° C. (aqueous solution of 10 percent strength). The ether of diethylene glycol monomethyl ether with glycollic acid is prepared in the manner described by M. H. Palomaa and T. A. Siitonen, Berichte der Deutschen Chemischen Gesellschaft, vol. 63, page 3120 (1930). The corresponding acid chloride is obtained in a manner analogous to that used for making the first mentioned acid chloride, and distils at 116–119° C. under 10 mm. pressure of mercury.

Example 5

The acid chloride (obtained from 5.2 parts of the ether of the polyethylene glycol monomethyl ether with α-hydroxycaproic acid of the formula

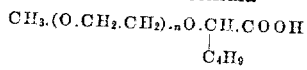

$$CH_3.(O.CH_2.CH_2)_n.O.CH.COOH$$
$$\quad\quad\quad\quad\quad\quad\quad\quad\quad | $$
$$\quad\quad\quad\quad\quad\quad\quad\quad\quad C_4H_9$$

in which $n$ has the average value of about 6–8, by heating it in solution in 15 parts by volume of benzene for 2 hours with 15 parts by volume of thionyl chloride at 50–60° C. and purified as described in Example 1 is dissolved in 10 parts by volume of toluene, and mixed at 0° C. in succession with a solution of 5 parts of 2:6-dimethylaniline in 5 parts by volume of toluene and with a solution of 1.1 parts of pyridine in 5 parts by volume of toluene. After allowing the mixture to stand for 2 hours, the mixture is taken up in 100 parts by volume of chloroform, agitated with 2 N-hydrochloric acid, a 2 N-solution of caustic soda and water and the aqueous layers are extracted with 50 parts by volume of fresh chloroform. By evaporating the combined chloroform layers there are obtained 6 parts of the ether of the polyethylene glycol monomethyl ether with α-hydroxycaproic acid of the formula

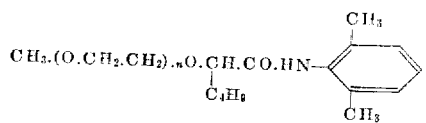

in which $n$ has the average value of about 6–8, and which, after treatment with animal carbon in the form of an aqueous solution of 10 percent strength, is a colorless oil which dissolves well in cold water, ethanol, benzene and ethyl acetate.

Its turbidity point is 35–36° C. (aqueous solution of 10 percent strength).

The carboxylic acid mixture used as starting material in this example is prepared as follows:

4.4 parts of potassium are dissolved at 90° C. in an atmosphere of hydrogen, while stirring in 90 parts of polyethylene glycol monomethyl ether having a boiling range of 135–175° C. under 0.005 mm. pressure of mercury ($n$=about 6–8), whereby the temperature rises to 110° C. After cooling the mixture to 25° C., 10 parts of α-bromocaproic acid are added, and the whole is stirred for a further 3 hours while the temperature is slowly raised to 100° C. The product is worked up in the manner analogous to that described in Example 1 for the corresponding ether-acid, and there are obtained 12.6 parts of the ether of polyethylene glycol monomethyl ether with α-hydroxycaproic acid in the form of a yellow oil.

Example 6

The acid chloride, obtained from 6 parts of the ether of heptaethylene glycol monomethyl ether with glycollic acid of the formula $$CH_3.(O.CH_2.CH_2)_7.O.CH_2.COOH$$

by reaction with 25 parts of thionyl chloride in 20 parts by volume of benzene in a manner analogous to that described in Example 1 is dissolved in 15 parts by volume of toluene and mixed at 0° C. in succession with a solution of 6 parts of paraethoxy-aniline in 10 parts by volume of toluene and a solution of 1.2 parts of pyridine in 5 parts by volume of toluene. After allowing the mixture to stand at room temperature for 2 hours it is taken up in 100 parts by volume of chloroform, shaken with 2 N-hydrochloric acid, a 2 N-solution of caustic soda and water, and the aqueous layers are extracted with 50 parts by volume of fresh chloroform.

The residue obtained from the chloroform solution by evaporation is dissolved in 100 parts by volume of water and treated with animal carbon. After repeated extraction with chloroform, of the filtered and practically colorless aqueous solution there are obtained 7.4 parts of the ether of hepta-ethylene glycol-monomethyl ether with glycollic acid N-para-ethoxyphenylamide of the formula

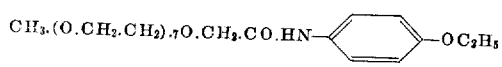

in the form of a pale yellow oil which dissolves well in cold water, ethanol and benzene.

Its turbidity point is 71° C. (aqueous solution of 10 percent strength).

The carboxylic acid used in this example as starting material is prepared as follows:

50 parts of pentaethylene glycol monomethyl ether are dissolved in 100 parts by volume of benzene, and mixed dropwise with 35 parts by volume of benzene sulfochloride, while stirring and cooling for ½ hour at 20–30° C. At the same time 15 parts of pulverized sodium chloride are introduced in uniform portions. The whole is stirred for a further 2½ hours, and is then allowed to stand overnight without stirring. The mixture is then filtered with suction to remove precipitated salts, and the filtrate is shaken with 20 parts by volume of an aqueous solution of ammonia of 25 percent strength for 4 hours. The benzene sulfochloride which may still be present is converted into the alkali soluble sulfonamide. 50 parts by volume of caustic soda solution of 10 percent strength are added and the whole is thoroughly agitated. The aqueous layer is extracted again once with 150 parts by volume of benzene, and the two benzene extracts are washed in succession with 50 parts by volume of a caustic soda solution of 10 percent strength and 50 parts by volume of water. By evaporating the dried benzene solution, there are obtained 70 parts of the solvent-free benzene sulfonic acid ester of pentaethylene glycol monomethyl ether in the form of a colorless oil.

40 parts of the latter oil are introduced dropwise in the course of one hour, while stirring, at 100° C. into a solution of 2.3 parts of sodium in 95 parts by volume of diethylene glycol, and the reaction mixture is maintained at 100° C. overnight. After being cooled, it is mixed with 250 parts by volume of water and shaken well with 100 parts by volume of chloroform. Extraction is repeated a further 7 times with 100 parts by volume of chloroform on each occasion, and the chloroform extracts are separately washed 4 times with 100 parts by volume of water on each occasion. By evaporating the chloroform extracts there are obtained 32 parts of an oil residue, from which 29.5 parts of heptaethylene glycol monomethyl ether distil in the form of a colorless oil under a high vacuum of 0.005 mm. pressure of mercury at 150° C.

5.2 parts of potassium are then dissolved at 100° C. while stirring, in an atmosphere of hydrogen in 95 parts of heptaethylene glycol monomethyl ether, the solution is cooled to 40° C. and 6 parts of chloroacetic acid are added. By working up in a manner analogous to that described in Example 1 there are obtained, in addition to 70 parts of regenerated heptaethylene glycol monomethyl ether 22.5 parts of the ether of heptaethylene glycol monomethyl ether with glycollic acid in the form of a yellow oil which dissolves well in water, ethanol and benzene.

Example 7

The acid chloride (obtained in a manner analogous to that described in Example 6 from 6 parts of the ether from heptaethylene glycol monoethyl ether with glycollic acid) is dissolved in 15 parts by volume of toluene and mixed at 0° C. first with a solution of 6 parts of diphenylamine in 20 parts by volume of toluene, and then with a solution of 1.2 parts of pyridine in 5 parts by volume of toluene. The mixture is allowed to stand for a few hours, then it is taken up in 150 parts by volume of chloroform, and the solution is extracted by agitation with 2 N-sulfuric acid, a 2 N-solution of caustic soda and water, and the aqueous layers are again extracted with 100 parts by volume of chloroform.

The chloroform extract is purified and evaporated, and the residue is dissolved in 200 parts by volume of water and treated with animal carbon. The filtered aqueous solution is separated with sodium chloride and extracted with chloroform. There is obtained as a residue from the chloroform extract 7.2 parts of the ether of heptaethylene glycol monomethyl ether with glycollic acid-N:N-diphenylamide of the formula

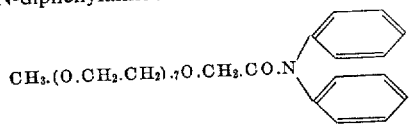

in the form of a bright yellow oil.

Its turbidity point is 68–69° C. (aqueous solution of 10 percent strength).

By reacting diphenylamine by the method described above with the acid chloride of the ether of octaethylene glycol monomethyl ether with glycollic acid described in Example 2, there is obtained the ether of octaethylene glycol monomethyl ether with glycollic acid-N:N-diphenylamide of the formula

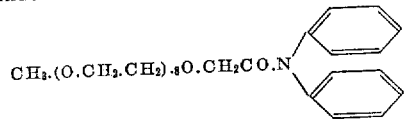

Its turbidity point is 74° C. (aqueous solution of 10 percent strength).

In a similar manner there can be obtained from the acid chloride of the ether of pentaethylene glycol monomethyl ether with glycollic acid described in Example 1, the ether of pentaethylene glycol monomethyl ether with glycollic acid-N:N-diphenylamide having a turbidity point of 55° C. (aqueous solution of 10 percent strength).

*Example 8*

0.7 part of sodium is dissolved at 100° C. in 35 parts of hepta-ethylene-glycol-mono-methyl ether of boiling point 150° C. (0.005 mm. Hg) in an atmosphere of hydrogen. While stirring vigorously, 7.5 parts of α-point 150° C. (0.005 mm. Hg) in an atmosphere of amide are then added in portions and heating to 110° C. continued for 14 hours.

After cooling, 200 parts by volume of water are added and the mixture is extracted three times with 200 parts by volume of benzene each time. The benzene layers are then successively extracted twice with 200 parts by volume of water, then dried over sodium sulfate and evaporated. There are obtained as a residue 16.4 parts of the ether of hepta-ethylene-glycol-mono-methyl ether with glycollic acid-N-butyl-(n)-N-2:6-dimethylphenyl-amide of the formula

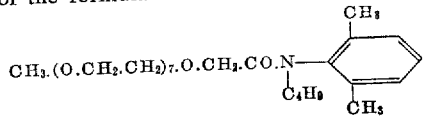

This residue is a faintly yellow-colored oil which dissolves readily in ethanol, benzene, ethyl acetate and cold water. For purification, an aqueous solution of 10 percent strength is treated with a small amount of animal charcoal, filtered, and the filtrate saturated with sodium chloride and extracted with benzene. On evaporation of the solvent, the new compound is obtained as a practically colorless oil of turbidity point 62° C. (10% aqueous solution).

The α-chloracetic acid-N-butyl-(n)-N-2:6-dimethylphenylamide can be prepared in the following manner:

A solution of 8.9 parts of N-butyl-(n)-2:6-dimethyl-aniline in 25 parts by volume of acetone is mixed at 10° C. and while being vigorously stirred, first with a solution of 8 parts of chloracetyl chloride in 10 parts by volume of acetone and then with 100 parts by volume of a saturated sodium acetate solution. The mixture is then extracted with 100 parts by volume of ether and the ethereal solution extracted by agitation three times with 50 parts by volume of 2 N-sulfuric acid, three times with 50 parts by volume of saturated sodium bicarbonate solution, and three times with 50 parts by volume of water. The ethereal solution is dried over sodium sulfate. On evaporation, 8 parts of α-chloracetic acid-N-butyl-(n)-N-2:6-dimethyl-phenyl-amide are obtained as a viscous oil which solidifies after a short while. This new compound boils at 102–103° C. (0.01 mm. Hg), can be recrystallized from petroleum ether, and then melts at 40–41° C.

The ether of hepta-ethylene-glycol-mono-methyl ether with glycollic acid-N-butyl-(n)-N-2:6-dimethylphenyl-amide can also be prepared by a process analogous to that described in Example 1.

By reacting in the manner described in this example α-chloracetic acid-N-butyl-(n)-N-2:6-dimethylphenyl-amide with the sodium compound of hexa-ethylene-glycol-mono-methyl-ether, there is also obtained a good yield of the ether of hexa-ethylene-glycol-mono-methyl ether with glycollic acid-N-butyl-(n)-N-2:6-dimethyl-phenyl-amide of the formula

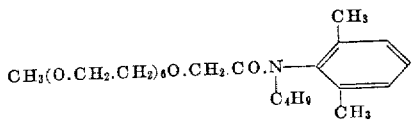

whose turbidity point is at 55° C. (10% aqueous solution).

By an analogous reaction of the α-chloracetic acid-N-butyl-(n)-N-2:6-dimethylphenyl-amide with the sodium compound of tetra-ethyleneglycol-mono-methyl ether there is obtained the ether of tetra-ethyleneglycol-mono-methyl ether with glycollic acid-N-butyl-(n)-2:6-dimethylphenyl-amide of the formula

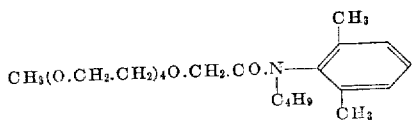

which is a colorless oil boiling at 183–184° C. (0.01 mm. Hg) and has a turbidity point of 39° C. (10% aqueous solution).

When the α-chloracetic acid-N-hexyl-(n)-2:6-dimethyl-phenyl-amide is reacted with the sodium compound of hexa-ethylene-glycol-monomethyl-ether in the manner described in this example, there is also obtained a very good yield of the ether of hexa-ethylene-glycol-monomethyl-ether with glycollic acid-N-hexyl-(n)-N-2:6-dimethyl-phenyl-amide of the formula

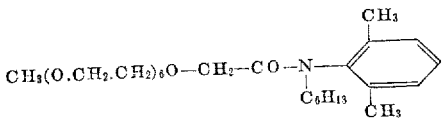

Its turbidity point is 46° C. (aqueous solution of 10 percent strength). The α-chloracetic acid-N-hexyl-(n)-2:6-dimethyl-phenyl-amide used here is prepared in a manner analogous to α-chloracetic acid-N-butyl-(n)-2:6-dimethyl-phenyl-amide and boils as a colorless oil at 123° C. under 0.04 mm. of pressure.

By an analogous reaction of the α-chloracetic acid-N-heptyl-(n)-N-2:6-dimethyl-phenyl-amide with the sodium compound of hexa-ethylene-glycol-monomethyl ether there is obtained the ether of hexa-ethylene-glycolmonomethyl ether with glycollic acid-N-heptyl-(n)-2:6-dimethyl-phenyl-amide of the formula

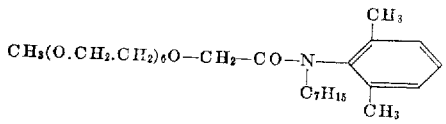

Its turbidity point is 46° C. (aqueous solution of 10 percent strength). The α-chloracetic acid-N-heptyl-(n)-2:6-dimethyl-phenyl amide used here distils as a colorless oil at 127° C. under 0.008 mm. of pressure.

*Example 9*

1.1 parts of sodium are dissolved at 90–100° C. in 35 parts of di-ethylene glycol while stirring vigorously. Also while stirring vigorously, a solution of 12 parts of α-chloracetic acid - N - butyl - (n)-N-2:6-dimethyl-phenyl-amide in 10 parts by volume of di-ethyleneglycol is run in at 100° C. and the temperature is then maintained at 110° C. for 15 hours. After cooling, 200 parts by volume of water are added and the mixture extracted three times with 200 parts by volume of benzene. The benzene solutions are extracted separately and in succession twice with 200 parts by volume of water, dried over sodium sulfate, and evaporated. The residue is distilled at 165° C. (0.01 mm. Hg). In this manner, 13.2 parts of the ether of di-ethyleneglycol with glycollic acid-N-butyl-(n)-N-2:6-dimethyl-phenyl-amide of the formula

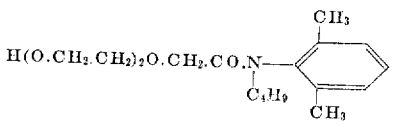

are obtained. It is a colorless oil which readily dissolves in ethanol, benzene, ethyl acetate and cold water and has a turbidity point of 28° C. (10% aqueous solution).

By analogous reaction of the α-chloracetic acid-N-butyl-(n)-N-2:6-dimethylphenyl-amide with the monosodium compound of tri-ethyleneglycol there is obtained a good yield of the ether of tri-ethyleneglycol with glycollic acid-N-butyl-(n)-N-2:6-dimethylphenyl-amide of the formula

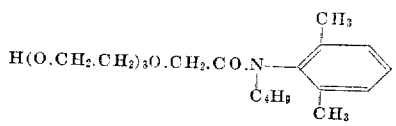

It is a colorless oil which boils at 178° C. (0.01 mm. Hg), and has a turbidity point of 48° C. (10% aqueous solution).

*Example 10*

The acid chloride described in Example 1 and obtained from 78 parts of the ether of pentaethylene glycol monomethyl ether with glycollic acid is dissolved in 200 parts by volume of toluene. A solution of 59 parts of hydrochloride of 2:6-dimethyl-4-(n)-butoxy-aniline, 40 parts of pyridine and 300 parts by volume of toluene is added dropwise at 0° C. while stirring. After allowing the mixture to stand for 3 hours at room temperature, it is diluted with 500 parts by volume of toluene and extracted by agitation three times with 300 parts by volume of 2 N-sulfuric acid, twice with 300 parts by volume of 1 N-solution of caustic soda and once with 300 parts by volume of water. The aqueous layers are extracted consecutively twice with 500 parts by volume of toluene. The combined toluene layers are then concentrated and from these there are obtained as residue after degasification in high vacuum 110 parts of the ether of pentaethylene glycol monomethyl ether of glycollic acid-N-2:6-dimethyl-4-(n)-butoxyphenyl amide of the formula

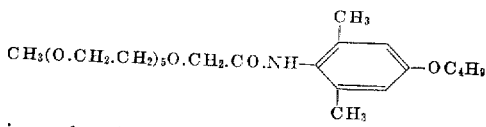

This product is a pale yellow oil which dissolves well in ethanol, benzene, ethyl acetate, ether and cold water. For the purpose of purification the substance can be distributed between water and ether in a ratio of 10 to 1 and extracted from the water with chloroform, an almost colorless oil being obtained.

The product has a turbidity point of 44° C. (aqueous solution of 10 percent strength).

The hydrochloride of 2:6-dimethyl-4-(n)-butoxy-aniline used as starting material may be prepared as follows:

126 parts of 2:6-dimethyl-4-hydroxy-azo-benzene are dissolved in a solution of 140 parts by volume of 4 N-sodium methylate in methanol and 500 parts by volume of methanol and mixed with 61.5 parts by volume of N-butylbromide. The whole is boiled under reflux for 15 hours and then poured slowly into a well stirred mixture of 2000 parts of ice, 4000 parts by volume of water and 230 parts by volume of 2 N-caustic soda solution. The red precipitate is filtered off and washed with water until neutral. After drying, the product is recrystallized from 800 parts by volume of methanol (cooling to −15° C.), 88 parts of pure 2:6-dimethyl-4-butoxy-azobenzene being obtained in the form of red needles melting at 47–48° C.

From this compound there is obtained on hydrogenating with half the quantity of Raney-nickel in 12 times the quantity of ethanol, a mixture of aniline and 2:6-dimethyl-4-butoxy-aniline, which, after filtering off the catalyst and distilling off the solvent, is separated by distillation in vacuo. The 2:6-dimethyl-4-butoxy-aniline boils at 156–157° C. under 11 mm. pressure of mercury and can be dissolved hot in four times the quantity of hydrochloric acid of 10 percent strength. From this solution the hydrochloride can be crystallized out on cooling in the form of colorless flakes. For the purpose of purification the product may be recrystallized from methanolic hydrochloric acid or from 2 N-hydrochloric acid with the addition of active charcoal. The pure hydrochloride melts with decomposition at 190–192° C.

In the same way the ether of hexaethylene glycol monomethyl ether with glycolic acid-N-2:6-dimethyl-4-(n)-butoxy-phenyl amide of the formula

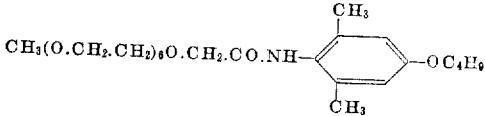

can be prepared from the acid chloride of the ether of hexaethylene glycol monomethyl ether of glycollic acid.

The product has a turbidity point of 51° C. (aqueous solution of 10 percent strength).

The glycollic acid used here may be prepared as follows:

2.3 parts of sodium are dissolved while stirring in a hydrogen atmosphere in 60 parts of hexaethylene glycol monomethyl ether heated to 90–95° C. The solution is then cooled to 30° C. and 12.8 parts of the sodium salt of chloracetic acid added while stirring vigorously. Stirring is continued for 2 hours at 80° C. and the whole is then allowed to stand for 12 hours. 100 parts by volume of water and 5 parts by volume of 2 N-caustic soda solution are then added to the mixture. In order to remove the excess of hexaethylene glycol monomethyl ether, the alkaline solution is extracted once with 300 parts by volume of chloroform and five times with 150 parts by volume of chloroform. The chloroform layers are first washed consecutively twice with 50 parts by volume of water, then combined and concentrated. The residue consists of 30 parts of regenerated hexaethylene glycol monomethyl ether.

The combined aqueous, alkaline layers are acidified with 15 parts by volume of concentrated hydrochloric acid and then extracted once with 300 parts by volume of chloroform and five times with 150 parts by volume of chloroform. From the chloroform solution there are obtained after concentration and degasification in high vacuum 33 parts of the ether of hexaethylene glycol monomethyl ether with glycollic acid as a yellow oil. The crude ether-acid can also be purified by way of its methyl ester. The latter is prepared by dissolving the acid in 100 parts by volume of ether and reacting it with an ethereal solution of diazomethane. The methyl ester distils as a colorless oil at 148–150° C. under 0.01 mm. pressure and can easily be converted back by alkaline hydrolysis into the polyether carboxylic acid which in the pure state is a practically colorless oil soluble in water, ethanol and benzene.

*Example 11*

The ether of pentaethylene glycol monomethyl ether with glycollic acid - N - butyl-(n)-N-2:6-dimethylphenyl amide obtained in Example 1 may also be prepared as follows:

1.4 parts of sodium are dissolved at 90–100° C. in 40 parts of ethylene glycol while stirring vigorously. 15.4 parts of α-chloracetic acid-N-butyl-(n)-N-2:6-dimethyl-phenyl amide are added at 100° C. while stirring vigorously and the whole is allowed to stand for 15 hours at 110° C. After cooling, 200 parts by volume of water are added, and the product is extracted twice with 200 parts by volume of benzene. The benzene solutions are extracted by agitation twice consecutively with 200 parts by volume of water, dried over sodium sulfate and evaporated. The residue is distilled at 138° C. under 0.01 mm. pressure. In this manner there are obtained 14.7 parts of the ether of ethylene glycol with glycollic acid-N-butyl-(n)-N-2:6-dimethylphenyl amide of the formula

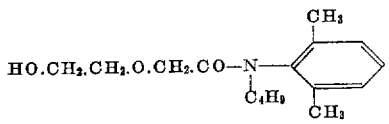

This amide is dissolved in 60 parts by volume of benzene and, while stirring thoroughly, 13 parts of benzene sulfochloride and 4.2 parts of pulverized sodium hydroxide are added simultaneously so that the temperature remains between 30–40° C. and the reaction mixture remains alkaline. Stirring is continued for an hour at room temperature and the whole is then allowed to stand for 15 hours. 70 parts by volume of water and 50 parts by volume of benzene are then added while stirring. The two layers are separated and the aqueous solution is extracted with 50 parts by volume of benzene. The combined benzene layers are agitated for three hours with 20 parts by volume of ammonia of 25 percent strength, then extracted rapidly with 50 parts by volume of 2 N-caustic soda solution and 50 parts by volume of water, dried over sodium sulfate and evaporated. There are thus obtained 21 parts of benzene sulfonic acid ester of the ether of ethylene glycol with glycollic acid-N-butyl-(n)-2:6-dimethylphenyl amide.

A solution of this sulfonic acid ester in 10 parts by volume of tetraethylene glycol monomethyl ether are added dropwise at 100° C. while stirring well to a solution of 1.2 parts of sodium in 40 parts by volume of tetraethylene glycol monomethyl ether and the mixture is heated for 15 hours at 110–120° C.

After cooling, 300 parts by volume of water are added and the product is extracted three times with 300 parts by volume of benzene. The benzene layers are extracted by agitation in succession twice with 300 parts by volume of water, then dried over sodium sulfate and evaporated. As residue there are obtained 19 parts of the ether of pentaethylene gylcol monomethly ether of glycollic acid-N-butyl-(n)-N-2:6-dimethylphenyl amide in the form of a viscous oil which has a turbidity point of 50° C. (aqueous solution of 10 percent strength). The oil can be purified by distillation in high vacuum. (Boiling point 178–180° C. under 0.007 mm. pressure.)

*Example 12*

5.9 parts of the ether of 1:2-propylene-glycol with glycollic acid-N-butyl-(n)-N-2:6-dimethyl-phenyl-amide of the formula

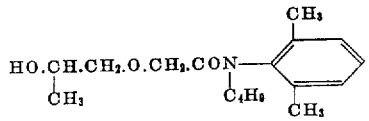

are heated with agitation with 7 parts by volume of ethylene oxide and 0.02 part of pulverized sodium hydroxide in a bomb tube for 15 hours at 170° C.

The contents of the bomb tube are then dissolved in 100 parts by volume of water, treated with 2 parts of animal charcoal and then extracted by agitation with 50 parts by volume of petroleum ether (boiling point 40–65° C.) to separate off any constituents which are difficultly soluble in water. After evaporating the petroleum ether layer, 0.27 part of a water-insoluble oil is obtained. The aqueous layer is extracted three times with 50 parts by volume of benzene, the benzene layers are evaporated and there are obtained 8.7 parts of a faintly yellow oil consisting of a mixture of ethers of poly-ethylene-glycol with the ether of 1:2-propylene glycol with glycollic acid-N-butyl-(n)-N-2:6-dimethyl-phenyl-amide of the formula.

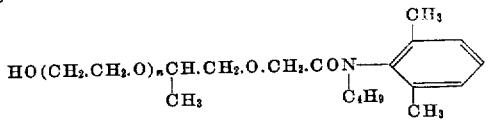

The separation of this mixture into various fractions can be effected by distribution between two liquid phases, possibly according to the principle of countercurrent extraction.

For example it is possible to proceed in the following manner:

8.7 parts of the oil obtained above are dissolved in 100 parts by volume of water and extracted three times with 50 parts by volume of ether. The first ether layer yields on evaporation an oily fraction of 1 part having a turbidity point of 26° C. (aqueous solution of 10 percent strength). From the second ether layer there is obtained a fraction of 0.8 part with a turbidity point of 41° C. and from the third ether layer a fraction of 0.3 part with a turbidity point of 50° C.

In order to avoid an emulsion, 5 parts of sodium chloride are dissolved in the aqueous layer and extraction is carried out first with a mixture of 25 parts by volume of ether with 25 parts by volume of benzene and then with 50 parts by volume of benzene. The ether and benzene layer yields a fraction of 6 parts having a turbidity point of 71° C. and the benzene layer a fraction of 0.55 part with a turbidity point of 87° C.

The ether of 1:2-propylene-glycol with glycollic acid-N-butyl-(n)-2:6-dimethyl-phenyl-amide used as starting material is prepared in an analogous manner to that of the ether of ethylene glycol with glycollic acid-N-butyl-(n)-N-2:6-dimethyl-phenyl-amide described in Example 11 by using 1:2-propylene glycol instead of ethylene glycol.

The new compound is a colorless water-insoluble oil which dissolves well in ordinary organic solvents and distils at 130–132° C. under 0.01 mm. of pressure.

Example 13

0.3 part of sodium is dissolved at 90–95° C. while stirring in an atmosphere of hydrogen in 23 parts of octa - ethylyene - glycol - ω - methyl ether - ω' - [2 - hydroxy-3-ethoxy-propyl-ether-(1)]. 3.8 parts of α-chloracetic acid-N-heptyl-(n)-2:6-dimethyl-phenyl-amide are then added while stirring vigorously and the whole is heated for 15 hours at 110° C.

After cooling, 150 parts by volume of water are added and the solution is extracted three times with 150 parts by volume of benzene. The benzene layers are extracted by agitation twice consecutively with 150 parts by volume of water, then dried over sodium sulfate and evaporated. As residue there are obtained 8.4 parts of the ether of octa-ethylene glycol-ω-methyl ether-ω'-[2-hydroxy-3-ethoxy-propyl ether-(1)] with glycollic acid-N-heptyl - (n) - N - 2:6 - dimethyl - phenyl amide of the formula

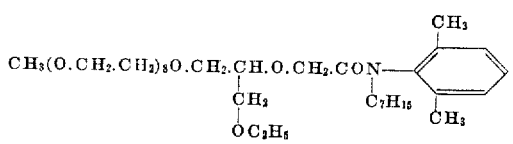

This product is a faintly yellow oil which dissolves well in ethanol, ether, benzene, ethyl acetate and cold water. Slight impurifications can be removed by extraction by agitation with a little ether of an aqueous solution of 10 percent strength. The pure substance has a turbidity point of 51° C. (aqueous solution of 10 percent strength).

The α-chloracetic acid-N-heptyl-(n)-N-2:6-dimethyl-phenyl amide used as starting material is prepared in a manner analogous to the α-chloracetic-acid-N-butyl-(n)-N-2:6-dimethyl-phenyl amide described in Example 8 and boils as a colorless oil at 127° C. under 0.008 mm. of pressure.

The octa-ethylene-glycol-ω-methyl ether-ω'-[2-hydroxy-3-ethoxy-propyl ether-(1)] used as starting material in this example can be prepared as follows:

2.4 parts of sodium are dissolved at 100° C. while stirring in 41 parts of glycerine-ω-ethyl ether, having a boiling point of 118–120° C. under 10 mm. of pressure, in a flask fitted with stirring means and with exclusion of moisture. Then in the course of 4 hours 52.4 parts of the benzene sulfonic acid ester of octa-ethylene-glycol-monomethyl ether, prepared by reacting benzene sulfonic acid ester of penta-ethylene-glycol-monomethyl ether with tri-ethylene-glycol and reacting the resulting octa-ethylene-glycol-monomethyl ether of boiling point 165° C. under 0.005 mm. of pressure with benzene sulfonic acid chloride in a manner analogous to that described in Example 1, are added dropwise at a temperature of 95–105° C. while stirring. After heating to 100–110° C. the mixture is cooled overnight and rinsed with 100 parts by volume of chloroform and 50 parts by volume of water in a separating funnel. In a second and third separating funnel 12.5 parts by volume of water are prepared. The chloroform layer is drained off after shaking from the first into the second and then into the third separating funnel. The three aqueous layers are extracted by agitation three times more with 100 parts by volume of chloroform on each occasion. The combined chloroform solutions dried with sodium sulfate are evaporated; after drying at 100° C. under 10 mm. of pressure, there are obtained 49.9 parts of a light brown oily residue. When distilled in high vacuum the chief part passes over at 195–215° C. under 0.01 mm. of pressure, from which there are obtained on distillation 34 parts of octa - ethylene - glycol - ω - methylether - ω'- [2 - hydroxy - 3 - ethoxy - propyl ether - (1)] boiling at 207–211° C. under 0.01 mm. of pressure in the form of a colorless, water-soluble oil.

Example 14

0.35 part of sodium is dissolved at 95° C. while stirring in an atmosphere of hydrogen in 30 parts of hexaethylene-glycol-monomethyl ether. 4 parts of α-chloracetic acid-N:N-di-ortho-tolyl amide are added at 140° C. while stirring vigorously and the mixture is heated for 3 hours at 140° C and for 12 hours at 110° C. After cooling, 150 parts by volume of water are added and the solution is extracted three times with 150 parts by volume of benzene. The benzene layers are extracted by agitation twice in succession with 150 parts by volume of water, then dried over sodium sulfate and evaporated. As residue there are obtained 7.4 parts of a yellow oil. To the latter are added 70 parts by volume of water and the weakly turbid aqueous solution is extracted by agitation for the purpose of removing insoluble constituents and small quantities of by-products first with 50 parts by volume of petroleum ether and then with 30 parts by volume of ether.

The aqueous clear solution is then extracted twice with 50 parts by volume of benzene. The benzene layers are extracted with 30 parts by volume of water, dried over sodium sulfate and evaporated. As residue there are obtained 6.1 parts of the ether of hexa-ethylene-glycol-monomethyl ether with glycollic acid-N:N-di-ortho-tolyl amide of the formula

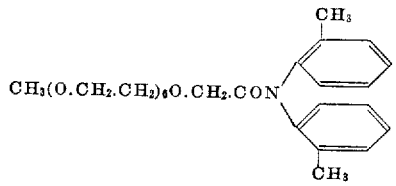

The product is a faintly yellow oil which dissolves well in ethanol, benzene, ethyl acetate and cold water and has a turbidity point of 52° C. (aqueous solution of 10 percent strength).

The α-chloracetic acid-N:N-di-ortho-tolyl amide used as starting material in this example is prepared as follows:

A solution of 4 parts of ortho-ditolyl-amine and 3-4 parts of chloracetyl chloride in 40 parts by volume of toluene is boiled under reflux for 5 hours, evaporated in vacuo and the solid residue is twice crystallized from a mixture of ethyl acetate and petroleum ether. In this manner there are obtained 4.8 parts of α-chloracetic acid-N:N-di-ortho-tolyl amide as white crystals of melting point 123–124° C.

What is claimed is:

1. Poly-1:2-glycol ethers of the formula

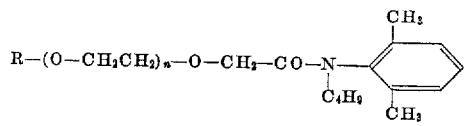

wherein R stands for a lower alkyl radical and $n$ represents a whole number from 4 to 8 inclusive.

2. Poly-1:2-glycol ethers of the formula

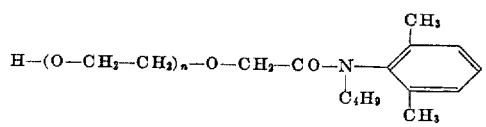

wherein $n$ represents a whole number from 4 to 8 inclusive.

3. The poly-1:2-glycol ether of the formula

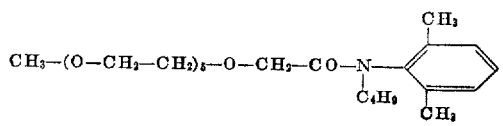

4. Poly-1:2-glycol ethers of the formula:

$$R-(OCH_2CH_2)_n-O-CH_2-CO-N(Y)-Z$$

wherein $n$ represents a whole number from 2 to 20 inclusive, R represents a member selected from the group consisting of hydrogen and alkyl radicals containing at most 7 carbon atoms, Y represents a member of the group consisting of hydrogen and an alkyl radical containing at most 7 carbon atoms, and Z represents a member selected from the group consisting of 2,6-dimethylphenyl and 2,6-dimethyl-4-lower-alkoxyphenyl radicals.

References Cited in the file of this patent

UNITED STATES PATENTS 2,520,551  Kilgore _____ Aug. 29, 1950

U. S. DEPARTMENT OF COMMERCE
PATENT OFFICE
CERTIFICATE OF CORRECTION

Patent No. 2,769,838                                                           November 6, 1956

Max Matter et al.

It is hereby certified that error appears in the printed specification of the above numbered patent requiring correction and that the said Letters Patent should read as corrected below.

Column 9, line 45, Example 8, strike out "point 150° C. (0.005 mm. Hg) in an atmosphere of" and insert instead --chloracetic acid-N-butyl-(n)-N-2:6-dimethyl-phenyl- --; column 10, line 66, for "46° C." read --48° C.--.

Signed and sealed this 11th day of March 1958.

(SEAL)
Attest:

KARL H. AXLINE

Attesting Officer

ROBERT C. WATSON
                                                                               Commissioner of Patents